US010345464B2

(12) United States Patent
Guillaume

(10) Patent No.: US 10,345,464 B2
(45) Date of Patent: Jul. 9, 2019

(54) BOUNDARY LAYER TOMOGRAPHY METHOD AND DEVICE

(71) Applicant: CGG SERVICES SA, Massy (FR)

(72) Inventor: Patrice Guillaume, Orsay (FR)

(73) Assignee: CGG SERVICES SAS, Massy (FR)

( * ) Notice: Subject to any disclaimer, the term of this patent is extended or adjusted under 35 U.S.C. 154(b) by 586 days.

(21) Appl. No.: 14/959,079

(22) Filed: Dec. 4, 2015

(65) Prior Publication Data

US 2016/0266267 A1 Sep. 15, 2016

Related U.S. Application Data

(60) Provisional application No. 62/131,850, filed on Mar. 12, 2015.

(51) Int. Cl.
*G01V 1/28* (2006.01)
*G06F 17/11* (2006.01)
*G01V 1/30* (2006.01)

(52) U.S. Cl.
CPC .............. *G01V 1/282* (2013.01); *G01V 1/303* (2013.01); *G06F 17/11* (2013.01); *G01V 2210/6222* (2013.01)

(58) Field of Classification Search
CPC ................... G01V 1/282; G01V 1/303; G01V 2210/6222; G06F 17/11
USPC .......................................................... 703/2
See application file for complete search history.

(56) References Cited

U.S. PATENT DOCUMENTS

| 6,577,955 B2 | 6/2003 | Guillaume |
| 2013/0322212 A1* | 12/2013 | Pica ........................ G01V 1/303 367/38 |

OTHER PUBLICATIONS

Guillaume_Velocity_2012 (Velocity model building in complex media by multi-layer non-linear slope tomography, Patrice Guillaume, Jean-Philippe Montel*, Xiaoming Zhang, Gilles Lannbaré, Anthony Prescott, Matthieu Reinier, Richard Jupp, Steve Hollingworth, Alexandre Cavalié, CGGVeritas, Nov. 7, 2012).*
Guillaume_2008 (Kinematic invariants: an efficient and flexible approach for velocity model building, 78th annual SEG meeting, Las Vegas 2008).*
Guillaume_2012 (Multi-Layer Tomography and its application for improved depth imaging, SEG Technical Program, 2012).*
Extended European Search Report in corresponding European Application No. EP 15 30 6954 dated Jul. 11, 2016.
P. Guillaume, et al.; "Multi-layer non-linear slope tomography"; 7th EAGE Conference & Exhibition Incorporating SPE Europec 2013; XP055284288; Jun. 10, 2013; pp. 1-5.

(Continued)

*Primary Examiner* — Brian S Cook
(74) *Attorney, Agent, or Firm* — Patent Portfolio Builders PLLC

(57) ABSTRACT

Methods and systems for processing seismic data for improving an image of a surveyed subsurface. The method includes receiving seismic data associated with the surveyed subsurface; applying a multi-layer non-linear slope tomography algorithm to iteratively calculate a new boundary of a first layer of the surveyed subsurface and to calculate a velocity attribute of a second layer of the surveyed subsurface; and generating an improved image of the surveyed subsurface based on the new boundary of the first layer and the velocity attribute of the second layer.

18 Claims, 15 Drawing Sheets

(56) References Cited

OTHER PUBLICATIONS

M. Reiner, et al.; "Building a robust depth imaging veolcity model in North Sea"; SEG Technical Prorgam Expanded Abstracts 2012; XP055284264; Oct. 24, 2012; pp. 1-5.

D. Guillaume, et al.; "Seismic imaging with multi-layer tomography"; First Break; [retrieved from the Internet on Mar. 29, 2016 at http://www.earthdoc.org/publication/publicationdetails/?publication-63234]; XP055284352; Oct. 1, 2012; 85-90.

\* cited by examiner

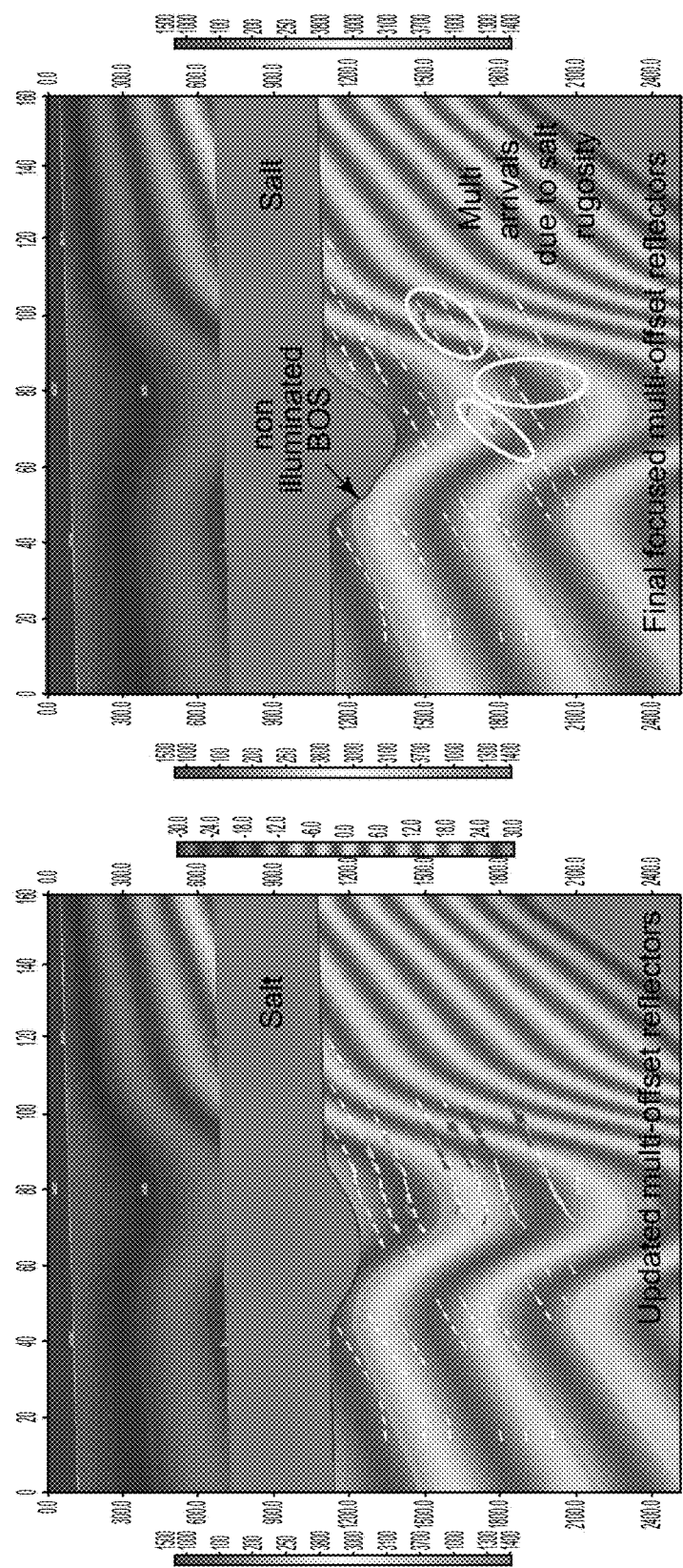

BOUNDARY LAYER TOMOGRAPHY METHOD AND DEVICE

RELATED APPLICATION

The present application is related to, and claims priority from U.S. Provisional Patent Application No. 62/131,850, filed on Mar. 12, 2015, to Patrice Guillaume, the disclosure of which is incorporated herein by reference.

TECHNICAL FIELD

Embodiments of the subject matter disclosed herein generally relate to methods and systems for seismic image acquisition and, more particularly, to mechanisms and techniques for generating an earth model by a tomography method based on seismic data.

BACKGROUND

Seismic data acquisition and processing techniques are used to generate a profile (image) of a geophysical structure (subsurface) of the strata underlying the land surface or seafloor. Among other things, seismic data acquisition involves the generation of elastic waves and the collection of reflected/refracted versions of those elastic waves to generate the image. This image does not necessarily provide an accurate location for oil and gas reservoirs, but it may suggest, to those trained in the field, the presence or absence of oil and/or gas reservoirs. Thus, providing a more accurate image of the subsurface, and preferably in a shorter period of time, is an ongoing process in the field of seismic surveying.

As will be appreciated by those skilled in the art, a significant challenge in land and marine-based seismic data analysis is to calculate a velocity model for the surveyed seismic subsurface. Especially when the surveyed subsurface includes hard to illuminate formations, e.g., salts, it is difficult, if not impossible, to pick layer boundaries in a multi-layer velocity model, and thus such model cannot be updated. In this case, the geophysicist makes assumptions about the shape of the layers (or horizons) that cannot be interpreted or picked because of the lack of reflectivity or of too poor signal-to-noise ratio. For this scenario-based model update, seismic data needs to be re-migrated a large number of times before a satisfactory shape of the horizon is constructed such that it improves the image resolution in a plausible geological manner. This situation occurs in particular in the salt context, where salt boundaries cannot be picked by interpreter.

Thus, there is a need to replace or at least reduce the need for costly scenario testing where different possible horizon shapes are tried for non-pickable horizon and where seismic data for each trial is re-migrated.

Accordingly, it would be desirable to provide systems and methods that avoid the afore-described problems and drawbacks associated with velocity model building as part of an overall seismic data processing scheme.

SUMMARY

Methods and systems for velocity modelling of seismic data, and techniques for estimating parameters associated with velocity modelling, are described which address the afore-described problems.

According to an embodiment, there is a method for improving an image of a surveyed subsurface. The method includes receiving seismic data associated with the surveyed subsurface, applying a multi-layer non-linear slope tomography algorithm to iteratively calculate a new boundary of a first layer of the surveyed subsurface and to calculate a velocity attribute of a second layer of the surveyed subsurface, and generating an improved image of the surveyed subsurface based on the new boundary of the first layer and the velocity attribute of the second layer.

According to another embodiment, there is a computing device for improving an image of a surveyed subsurface. The computing device includes an interface that receives seismic data associated with the surveyed subsurface a processor connected to the interface. The processor is configured to apply a multi-layer non-linear slope tomography algorithm to iteratively calculate a new boundary of a first layer of the surveyed subsurface and to calculate a velocity attribute of a second layer of the surveyed subsurface and generate an improved image of the surveyed subsurface based on the new boundary of the first layer and the velocity attribute of the second layer.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9A-D illustrate the multi-layer non-linear slope tomography process applied to a synthetic example;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to pre-stack seismic reflection data. However, the embodiments to be discussed next are not limited to this type of data, but they may be extended to other type of data, for example, refraction data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, ray-based migration velocity analysis or tomography from pre-stack seismic reflection data is based on the characterization of the reflected migrated events by their position, multi-dimensional local dip and mis-focusing, usually measured by residual move-out (RMO). Such approaches update the depth velocity model through an optimization process, where the RMO of the migrated events (reflectors) picking from depth-migrated common image point gathers (CIGs) is minimized according to some additional constraints, such as the depth or the shape of some horizons or the smoothness or structural conformity of the velocity field.

Figure 1:
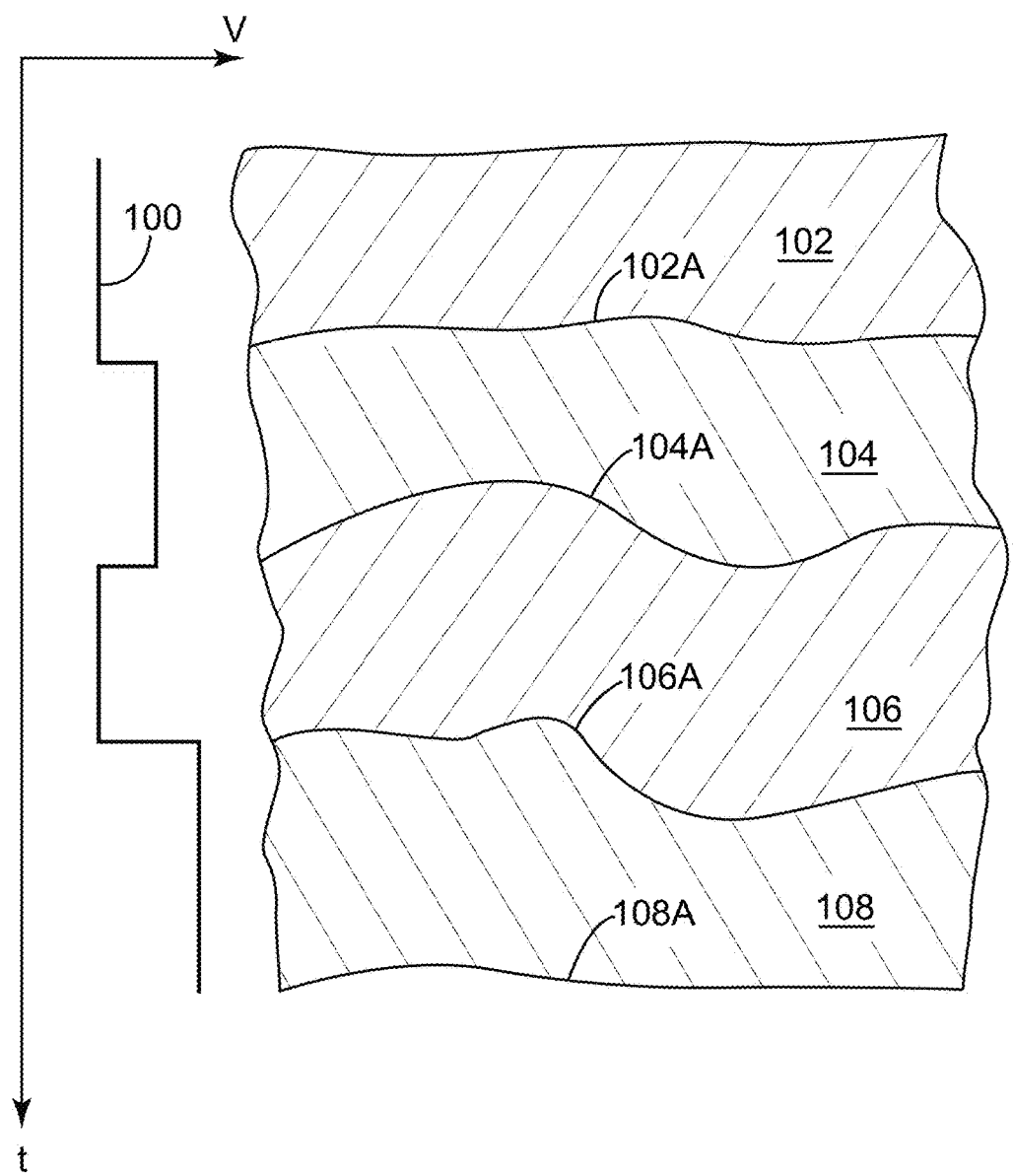
FIG. 1 illustrates a multi-layer model for an underground formation.

According to a novel embodiment, it is discussed herein to combine the non-linear slope tomography approach and the multi-layer model functionality with a new parameter (to be discussed later) and to minimize a new cost function term. The velocity model is assumed to be partitioned into layers bounded by horizons that usually describe major velocity contrasts. FIG. 1, shows a synthetic velocity model 100 associated with layers 102-108, each layer being separated by a corresponding horizon 102A-108A from an adjacent layer. In each layer, the velocity and velocity attributes (e.g., P-waves velocity Vp, S-waves velocity Vs, Thomsen's epsilon and delta parameters, transverse isotropy (TI) symmetry axis, orthorhombic parameters, Q interval attenuation, etc.) are described by preferably locally C2 continuous functions.

As will be discussed later in more detail, according to an embodiment, the tomography engine is adapted to both estimate the velocity attributes in one or several layers simultaneously and the shape of at least one layer boundary/horizon which could not be interpreted/picked on migrated seismic data because of lack of reflectivity or too poor signal-to-noise ratio. According to one or more of the embodiments to be discussed next, the new processing algorithm replaces or at least reduces the need for costly scenario testing as is currently done by the traditional tomographic processing algorithms. According to one embodiment, the shape of the non-pickable horizon is estimated by inverting the RMO picked volumetrically below the horizon to update. The layers' boundaries that could be fully interpreted from migrated seismic images can be re-positioned by a specific horizon migration process (map-migration for example) that preserves their traveltime characteristics (in particular zero-offset two-way-time) so that the repositioned boundaries are correctly superimposed upon their pre-stack depth migrated image obtained by migrating seismic signals with the updated velocity model. In other words, layers' boundaries are repositioned for those layers that can be picked (i.e., are visible) and layers' boundaries that cannot be picked (because they are not visible) are estimated by depth shifting.

More specifically, velocity model building aims at computing an accurate velocity model for seismic imaging. As the problem is a non-linear, ill-posed, inverse problem, it requires both a non-linear approach (involving, for example, iterative local optimizations) and relevant constraints. According to this embodiment, a processing algorithm inverts dense volumetric RMO, traveltime, and attenuation information for updating, simultaneously, in a non-linear manner, both the layer velocity and the layer geometry for several or all layers in the velocity model.

This new algorithm involves a particular velocity model definition where the velocity model is partitioned into layers bounded by horizons that usually describe major velocity contrasts. In each layer, the velocity attributes are described by preferably locally C2 continuous functions. In classical tomography, after some linearization, velocity perturbations are computed by solving a linear system built from back-projections of focusing errors onto the velocity parameters traversed by ray-paths associated with migrated locally coherent events. Layer boundaries are updated using traveltime information obtained through effective picking (and possibly de-migration) of the boundaries picked from migrated (preferred) or non-migrated seismics.

Figure 2A:
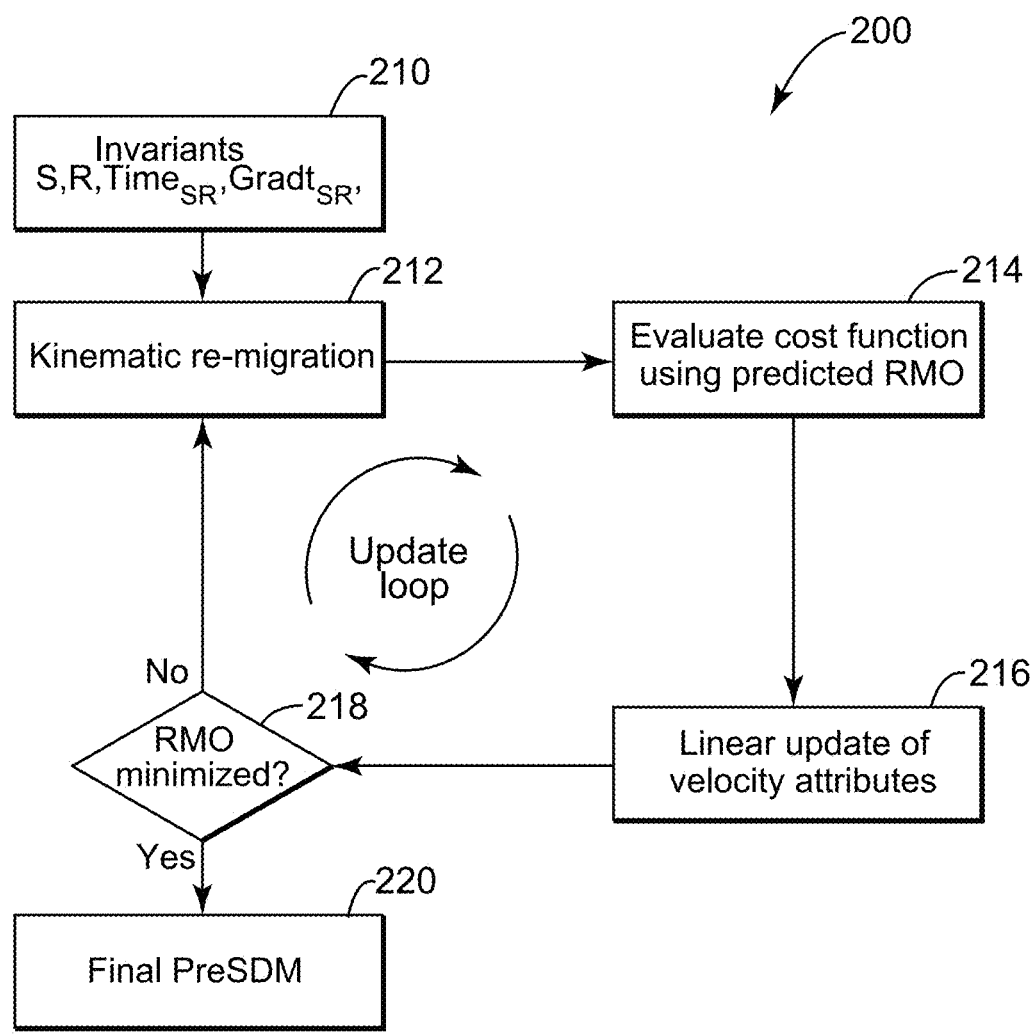
FIGS. 2A-B illustrate a non-linear tomography process for a single layer model.
Figure 2B:
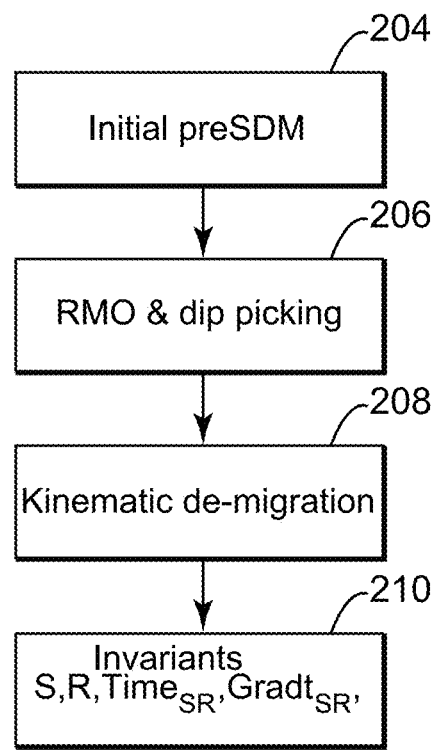

As a starting point for the more detailed discussion of the multi-layer non-linear slope tomography embodiments mentioned above, consider a single layer invariants-based RMO non-linear tomography methodology illustrated in FIGS. 2A and 2B. This conventional, single layer invariants-based RMO inversion methodology is described in U.S. Pat. No. 6,577,955 (hereafter the "955 patent"), the disclosure of which is incorporated here by reference, and the interested reader is directed to the '955 patent for more details regarding this process.

Briefly, however, as the embodiments build upon this progression, the inputs to the process 200 shown in FIG. 2A are various volumetric invariant values S, R, $TIME_{SR}$, and $GRADT_{SR}$ at input block 210. In this context the volumetric invariants input at 210 are combinations of model independent data (typically source and receiver positions (S and R), two-way traveltimes ($TIME_{SR}$) and traveltime slopes ($GRADT_{SR}$) in various acquisition scenarios (spatial or redundancy directions), which characterize an observable locally coherent piece of a seismic reflector and can be generated as illustrated in FIG. 2B. Note that a "volumetric" invariant means an invariant determined based on information from the entire volume of a given layer. This term is different from a "boundary" invariant, which is discussed later, and which refers to an invariant determined based on information associated with the boundary of a layer. Therein, using an initial migrated image of the recorded seismic data 204, i.e., the initial prestack depth migration data, picking 206 and finite-offset de-migration 208 processes are applied to acquire the desired volumetric invariants for use in the RMO inversion of FIG. 2B.

Other volumetric invariants may be used as will be understood by those skilled in the art. The volumetric invariants based method makes it possible to start the workflow from different types of data, e.g., pre-migration time data, migrated time data or depth migrated data. The invariants based method also makes it possible to start the model estimation with any starting velocity model, whereas in conventional methods, inverting data picked in the image domain, the starting model should be the migration model having served for computing the RMO data to be inverted.

Returning to FIG. 2A, the volumetric invariants-based RMO inversion performs an update loop including steps 212-218 during which the velocity model is iteratively updated until the RMO is minimized at step 218. Specifically, in block 212, a kinematic forward modelling process of the inversion data is performed. This step can include, for example, kinematically re-migrating RMO invariants in the current model, resulting in new facet positions and new predicted RMOs. This forward modeling step is non-linear and for this reason the entire algorithm is non-linear. From the output of step 212, a cost function can be evaluated by process box 214, by measuring discrepancies between observed data and data re-modelled in the current velocity model, e.g., the predicted RMOs. Any known cost function may be used. Step 216 is an inverse modelling step where model parameters are updated by solving a linearized system of equations built from the cost function output of step 214. Step 218 is a step wherein convergence of the inversion is tested: the iterative updating process in the update loop can stop if the objective function has reached a minimum (or similar value) or if the model update is becoming small enough or if the RMO is minimized. Output 220 indicates the final updated model/object after the iterative loop (including the forward+inverse modelling steps described above). With this information, after other traditional processing algorithms are applied, e.g., stacking, an image of the surveyed subsurface is generated.

Figure 3B:
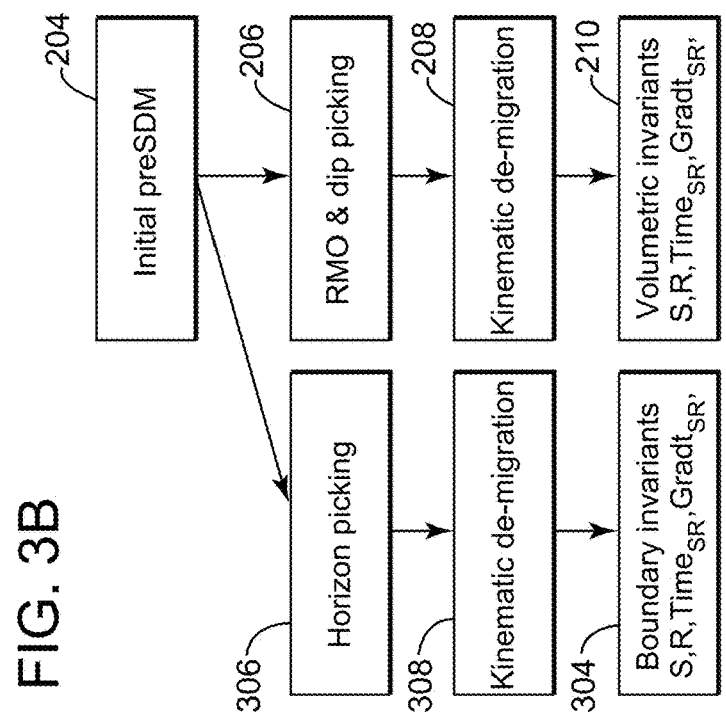
FIGS. 3A-B illustrate a non-linear tomography process for a multi-layer model.
Figure 3A:
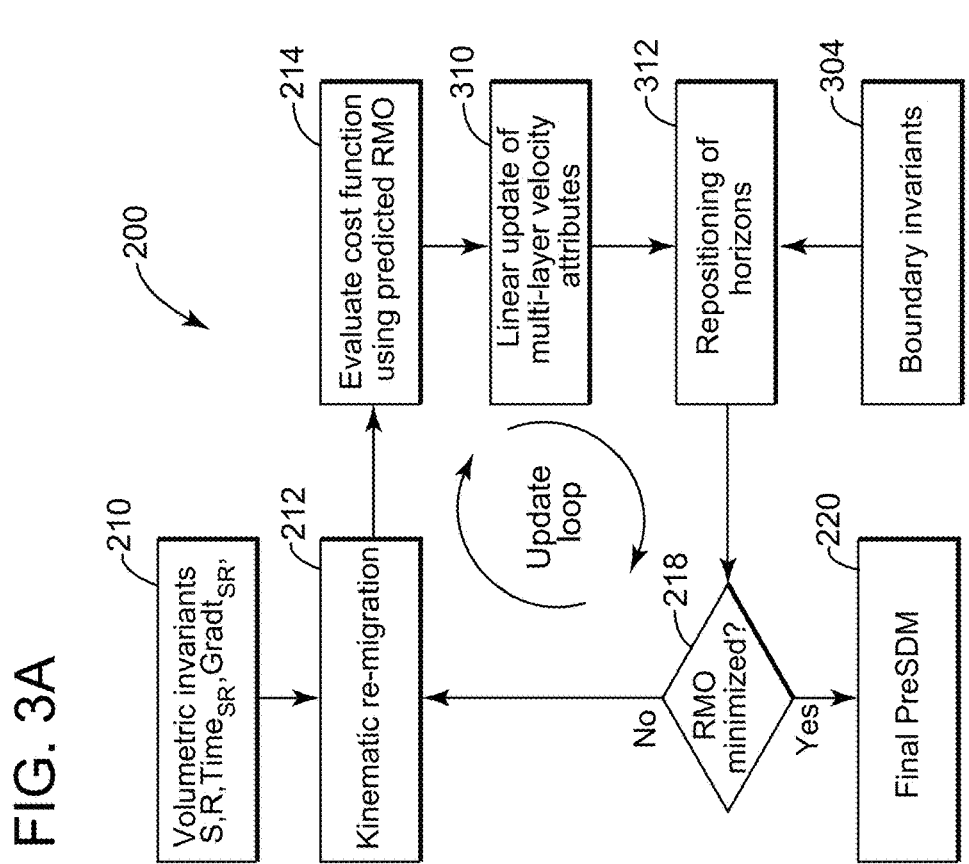

FIG. 3A shows another version of a non-linear slope tomography for seismic data, which has now been extended to be for a multi-layer velocity model. Therein, those steps/processes which are the same or similar to those performed above with respect to the single layer nonlinear tomography of FIGS. 2A and 2B are labeled with the same reference numeral and their description is not repeated here for conciseness.

Therein, the multi-layer nonlinear tomography 300 again starts with, as its inputs, certain volumetric invariants represented by block 210 and boundary invariants represented by block 304. One way to establish the input invariants is shown in FIG. 3B. Therein, the volumetric (RMO) invariants 210 are established in the same manner as described above with respect to FIG. 2B and steps 204-210. However, additionally, the multi-layer process 300 uses boundary invariants 304 which are determined by performing horizon picking 306 on the initial preSDM data 204, and then performing kinematic de-migration 308 on the results from the horizon picking. Note that while volumetric invariants 210 are determined based on the information available within a given volume, e.g., within a given layer, the boundary invariants 304 are calculated based only on the information available at the boundary of the given layer. In this application, the term "boundary" is used to mean information available at the boundary of an underground layer.

Returning now to FIG. 3A, the update loop begins with kinematic re-migration 212 and evaluating a cost function 214 using predicted RMO values output from the kinematic re-migration, as described above with respect to FIG. 2A. However, unlike step 216 in the single layer process of FIG. 2A, step 310 of the multi-layer process of FIG. 3A updates a multi-layer set of velocity attributes by solving a linear system of equations. Moreover, the multi-layer process 300 also includes a step 312 involving repositioning of the layers' horizons using the horizon invariants 304 and an output of the updated velocity attributes from step 310. The horizons of interest here are the horizons acting as layer boundaries in the multi-layer velocity model. Layer boundaries basically allow describing sharp velocity contrasts in the subsurface as the 3D grids describing the velocity attributes in each layer may have different values on both sides of a position sitting on layer boundary. Again, as in the single layer version of this tomography, the loop iterates until the RMO criterion is met at step 218 and then an image (preSDM data) is output at step 220.

Figure 4:
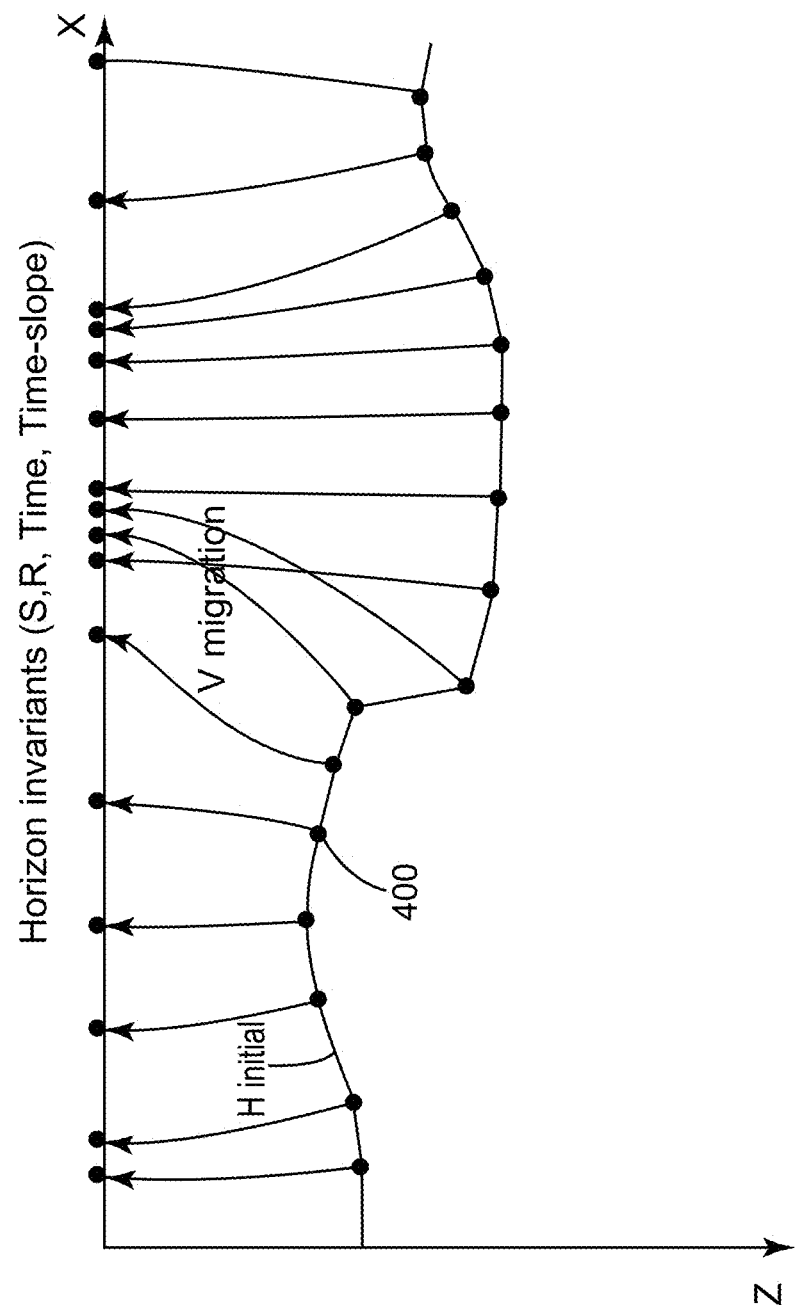
FIG. 4 illustrate volumetric invariants.
Figure 5:
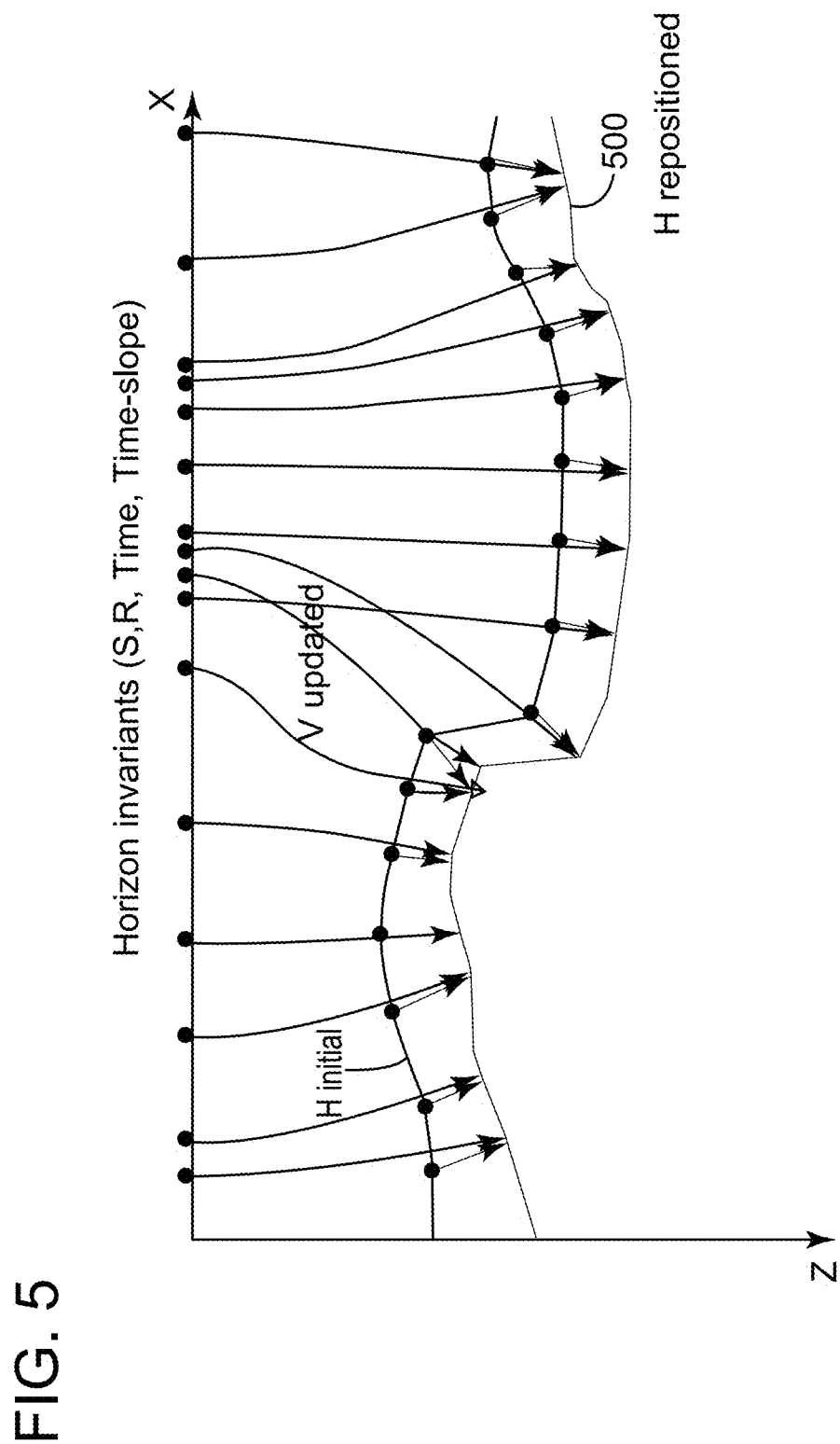
FIG. 5 illustrate kinematically migrated invariants.

The volumetric invariants of step 210 are illustrated in FIG. 4. This figure illustrates the step 308 of kinematic de-migration of an initial horizon $H_i$. In this step, reflection points 400 associated with the horizon or layer boundary $H_i$ are kinematically de-migrated using the previously determined (and stored) horizon invariants based on a migration velocity ($V_{migration}$). Then, using an updated velocity ration, ($V_{update}$), as shown in FIG. 5, the invariants are kinematically migrated (using for example map migration) to a repositioned horizon 500 based on field of displacement vectors in a manner which preserves the morphology of the horizon or layer boundary. The reposition of the horizon in FIG. 5 corresponds to step 312 in FIG. 3A. Note that the repositioning of horizons in step 312 may be performed in different ways depending upon the desired implementation.

Figure 6:
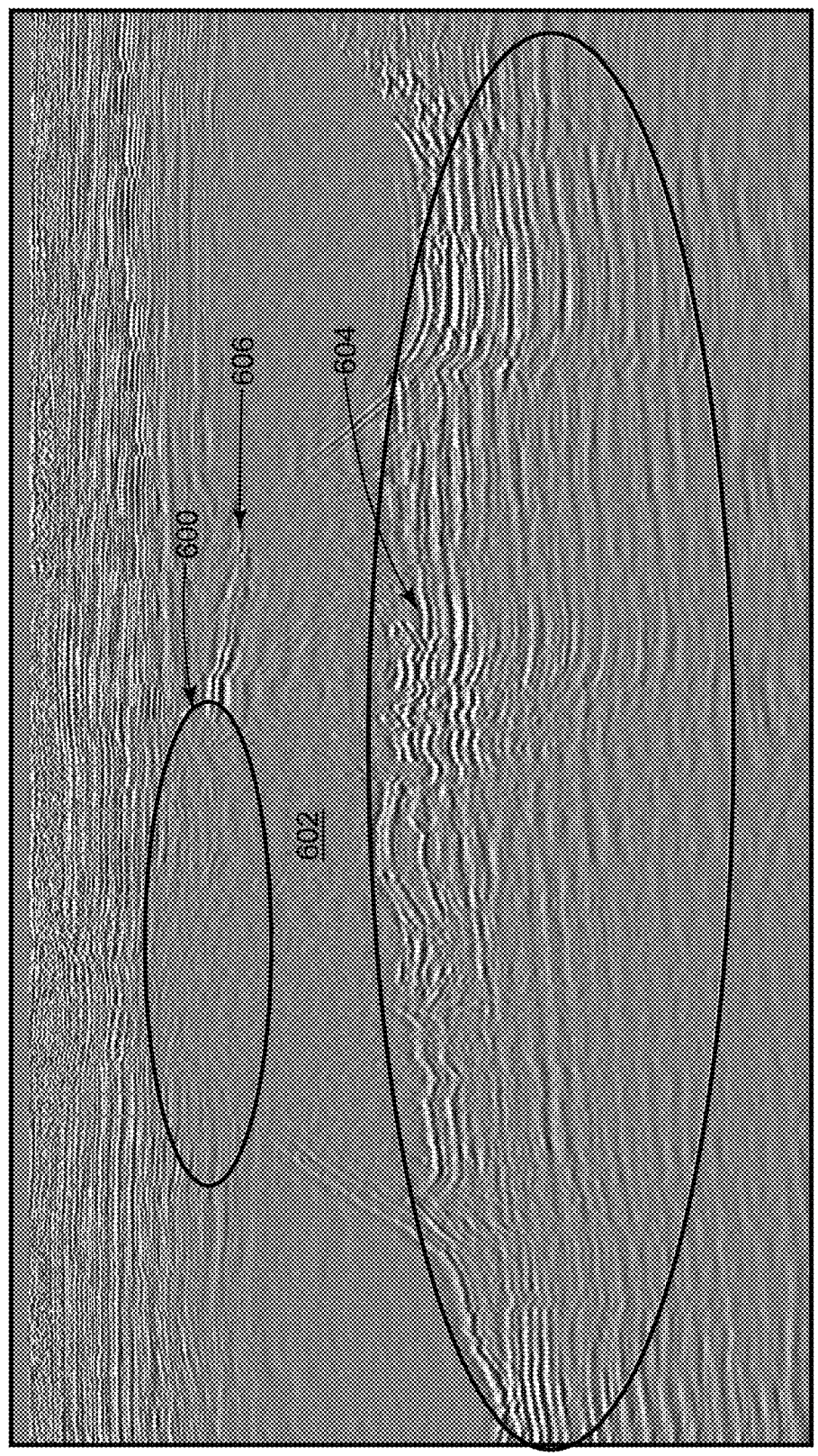
FIG. 6 illustrates a salt whose boundaries are only partially visible.

The algorithms described above may still suffer when layer boundaries cannot be picked and/or re-positioned in the multi-layer velocity model being updated. For example, in FIG. 6 a part 600 of top of a salt formation 602 is not being visible. A base 604 of the salt 600 is visible and also another top part 606 of the salt is visible. For this case, the geophysicist traditionally makes assumptions about the shape of the horizons part 600, because it cannot be interpreted or picked because of the lack of reflectivity or of too poor signal-to-noise ratio. However, as discussed above, under this scenario, the seismic data needs to be re-migrated a high number of times before a satisfactory shape is constructed, which is undesired.

Figure 7B:
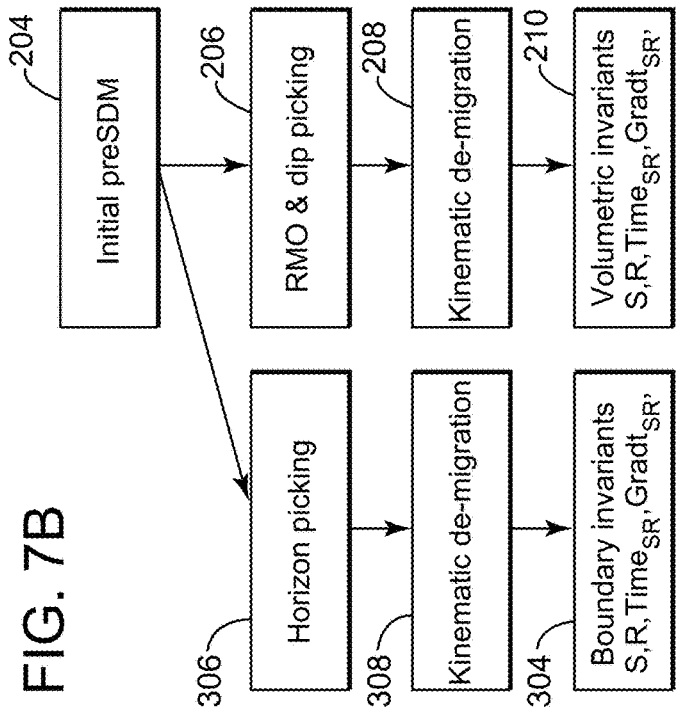
FIGS. 7A-B illustrate a multi-layer non-linear slope tomography process that shifts layer boundaries.
Figure 7A:
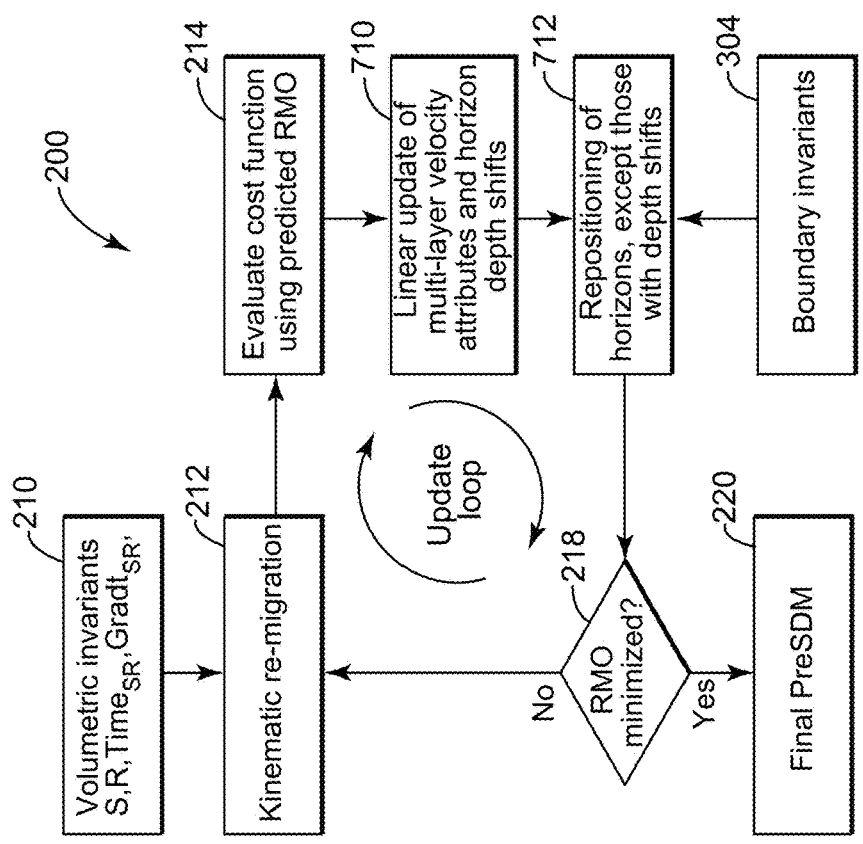

Thus, according to an embodiment, the following algorithm is implemented for overcoming these situations. As illustrated in FIGS. 7A and 7B, volumetric invariants and boundary invariants are calculated in steps 210 and 304, respectively, as previously described. A multi-layer non-linear slope tomography process 700 starts with the volumetric invariants in step 210 and progresses through steps 212-218 until an RMO condition is met. Steps 710 and 712 are different from the previous embodiments for the following reasons.

In step 710, for some layers of the multi-layer model, the velocity attributes are linearly updated as previously explained. However, for other layers of the multi-layer model, if their velocities are known or smooth, their horizons (or boundaries) are shifted/perturbed/estimated as next discussed. Note that while the model includes a given set of layers, a first sub-set of layers is used to update the velocity attributes and a second sub-set of layers is used to shift the horizon depths. The first and second sub-sets of layers, when added together, can equal the set of layers. However, it is also possible that the addition of the two sub-sets of layers is less than the set of layers.

In step 712, a third sub-set of layers has its horizons repositioned as previously discussed with regard to step 312. The third sub-set of layers, which belongs to the set of layers, does not share any layer with the second sub-set of layers. However, the third sub-set of layers may share one or more or none of the layers with the first sub-set of layers. In other words, a horizon to which a depth shift is applied, cannot be repositioned in step 712, for example, with a map migration process.

Figure 8A:
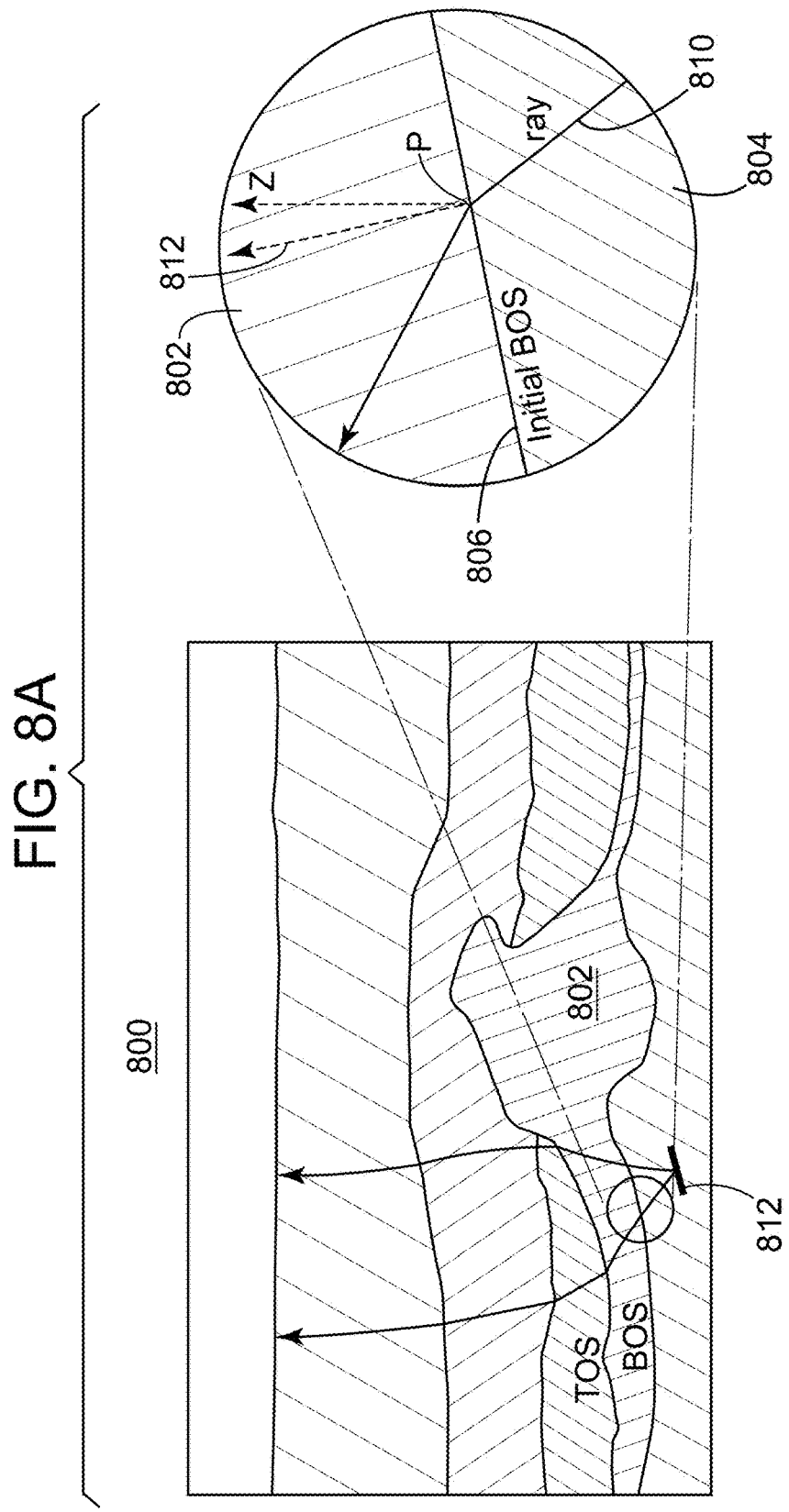
FIGS. 8A-C illustrate the shifting of the boundaries.

To exemplify these steps in a more visual way, FIG. 8A shows a multi-layer formation 800 having a salt layer 802. Please note that other formations may have part of their boundaries not visible. The top part of the salt layer 802 is referenced by TOS and the bottom part of the salt layer is referenced by BOS (Base Of Salt). The enlarged area to the right shows the boundary 806 (initial boundary) between salt 802 and sediment layer 804. A ray 810 reflected from a facet 812 is shown suffering a refraction at boundary 804. FIG. 8A also shows a dip 812 of the boundary and an axis Z, which is vertical. A ray and a modelled RMO slope are associated to that dip. The ray is crossing the BOS surface 806 to update. The RMO slope error is back-projected onto the BOS at traversal point P, as indicated in the figure. Inversion data and the inversion criterion are not changed. 3D velocity parameters are just replaced by 2D horizon parameters.

According to step 712, some bounding horizons are repositioned by (map) migration using updated velocities obtained in step 710. Repositioning is performed during the internal inversion loop after each velocity update. Map migration preserves horizon travel-times, thus insuring a match with remigrated seismics. Each migrated facet is described by an invariant.

Figure 8B:
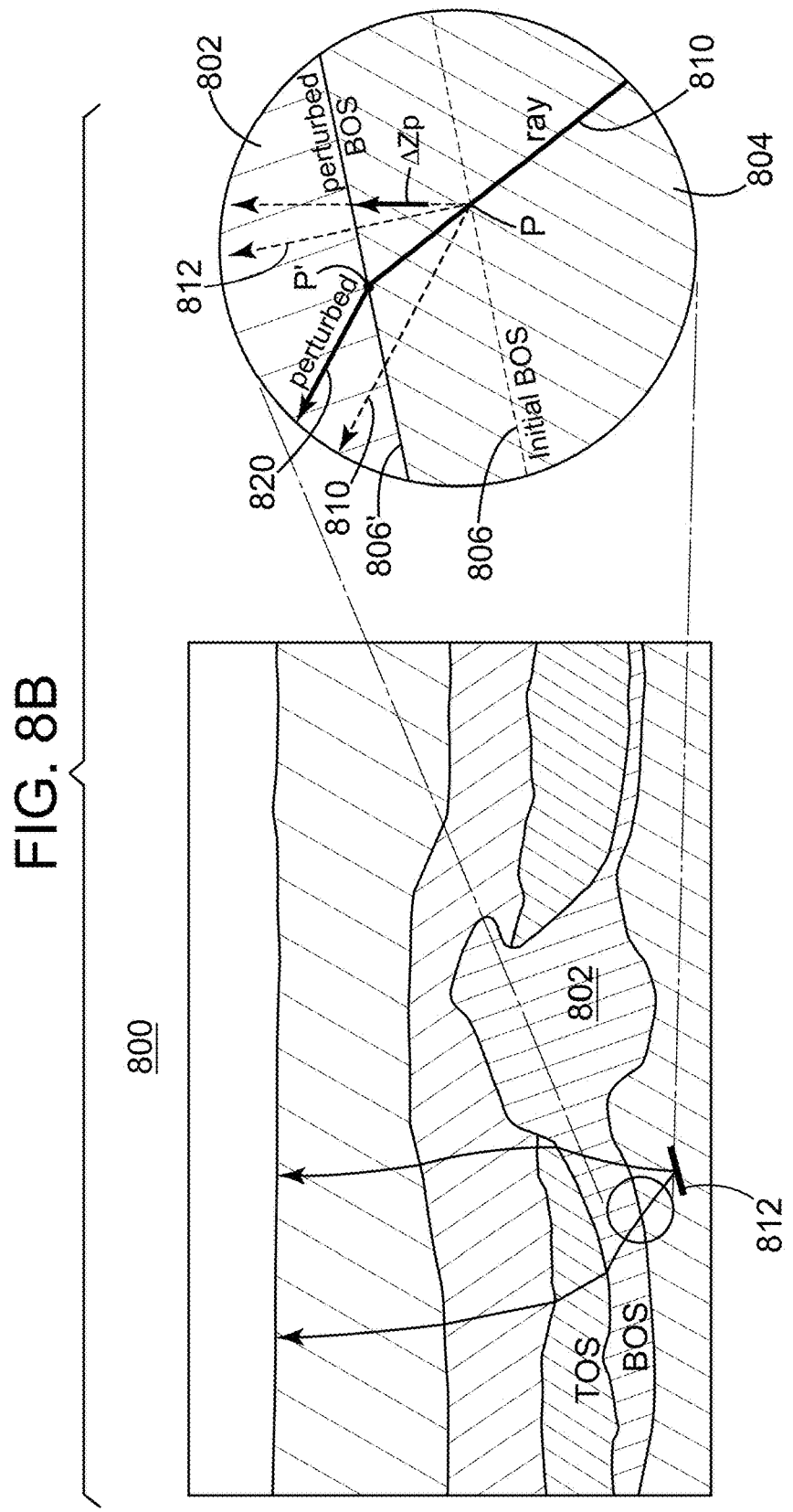
Figure 8C:
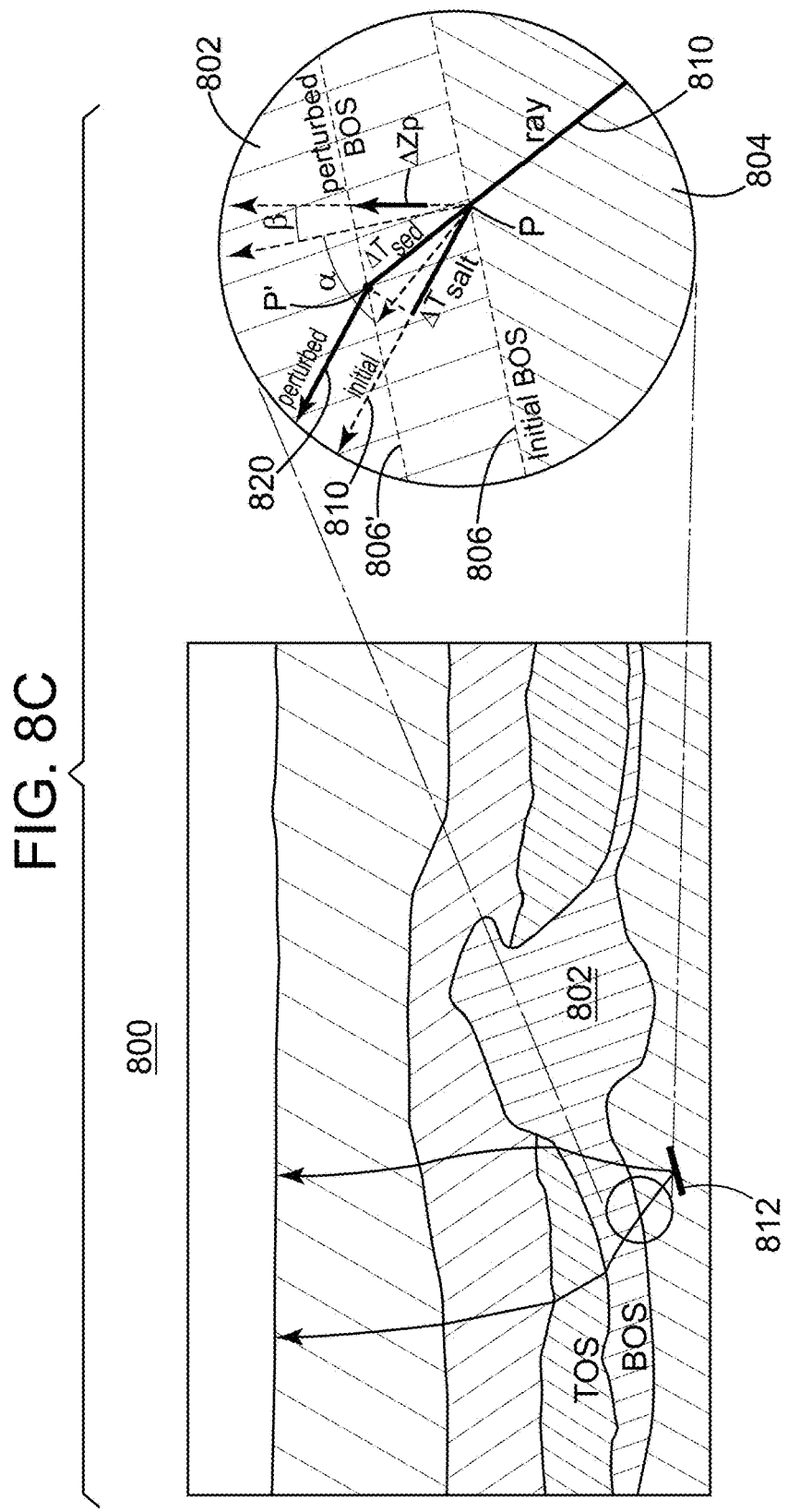

The algorithm of FIG. 7A updates the horizon (BOS) by inverting RMO information picked below the horizon of interest. In this case, the salt layer geometry is updated, not the salt velocity, which is assumed to be known or smooth. The algorithm assumes that BOS layer is mis-positioned, thus creating RMO in depth migrated common image point gathers (CIGs), as illustrated by facet 812 in FIG. 8B. The BOS horizon is depth shifted by depth $\Delta Z_p$ in step 710, as also illustrated in FIG. 8B. The value of $\Delta Z_p$ is computed by the non-linear slope tomography algorithm such that the RMO is minimized. As discussed above, only a sub-set of the layers are depth shifted. When boundary 806 is shifted to new boundary 806', the original ray 810 does not changes its direction at original point P, but later, at point P' that is located on new boundary 806'. This means that perturbed ray 820 travels an additional time interval $\Delta T_{sed}$ through the sedimentary layer 804 before being refracted at point P' as illustrated in FIG. 8C. The depth shift of BOS layer changes the ray travel-time by $\Delta T_{sed} - \Delta T_{salt}$, where $\Delta_{salt}$ is the time taken by the original ray 810 to travel in the salt until its wave front reaches point P'. The travel-time can be related in the tomography to picked RMO. Thus, RMO can be related to horizon depth shift. In an inversion problem, the horizon shift is the unknown parameter to solve by inverting the measured RMO, i.e., associated travel-time errors.

One possible way of relating the horizon shift $\delta Z_p$ (the unknown quantity to be solved) to the measured (or re-computed for non-linear tomography) RMO slope error $\delta$RMO is through Fréchet derivatives. The Fréchet derivative depends on the refraction angle, the horizon dip angle and the velocity contrast across the horizon. If the Fréchet derivative are used, a linear system of equations to be solved is generated, as exemplified in a simplified manner by the formula below:

$$\frac{\delta dRMO}{\delta Z_p} = \frac{\delta dRMO}{\delta T} \frac{\delta T}{\delta Z_p},$$

where $$\frac{\delta dRMO}{\delta T}$$

is the Fréchet derivative in standard RMO-based slope tomography for velocities, $Z_p$ describes the horizon to update and may be parametrized by B-splines, and $$\frac{\delta T}{\delta Z_p}$$

is approximatively given in one simplified linearizing manner (there are several ways of linearizing the local problem) by $$(U_{g_{sed}}(P) - U_{g_{salt}}(P)) \frac{\cos\beta}{\cos\alpha},$$

with β being the structural dip angle of BOS at position P, α being the angle between average ray direction (average between rays 810 and 820) and dip direction at position P (also known as aperture) and $U_g$ being the group slowness along different ray paths at perturbed horizon position P. Other formulae can use the exact refraction (transmission) angles rather than the average ray direction α. The Fréchet derivatives thus depend on a velocity contrast between the two layers that define the boundary, the aperture of the incident ray, and the depth of the horizon. The linear system of equations noted above can be written, in a generic form, as $$\frac{\delta dRMO}{\delta Z_p} = f\left(\frac{\delta dRMO}{\delta T}, \frac{\delta T}{\delta Z_p}\right).$$

The loop shown in FIG. 7A solves the Fréchet derivatives until the RMO is minimized in step 218. At that point, the image of the substrate is generated in step 220. In this way, this novel algorithm replaces or at least reduces the need for costly scenario testing where different possible horizon shapes are tried for non-pickable horizons and where seismic data for each trial is re-migrated.

The tomography engine discussed with regard to FIG. 7A is adapted to estimate both the velocity attributes in one or several layers and the shape of at least one layer boundary/horizon which could not be interpreted/picked on migrated seismic data. As noted above, the layers for which the velocity attributes are estimated are not the same as the layers for which their shape/boundary is determined. The shape of the non-picked horizon is estimated automatically by inverting the volumetric RMO information picked below the horizon to update. If there is cross-talk between velocity and depth shifts, then a covariance relationship between velocity perturbations and depth shifts is introduced in the tomography for mitigating the intrinsic depth/velocity ambiguity part of the ill-posed tomographic problem as applied to seismic data. In other words, velocity and layer boundary shifts are not independent parameters when describing the same layer.

The process of seismic inversion discussed above consists of conventional types of locally coherent (in time and/or space) pieces of seismic information, including volumetric RMO measurements obtained from pre-stack depth/time migrated collections of seismic traces or raw/observed volumetric travel-time, travel-time slope and positioning or delay measurements made from un-migrated seismic data. The data to be inverted can also include other types of seismic data including refraction data, first arrivals from vertical seismic profiles or surface seismic data, offset or angle dependent dip distortions of geological events, etc. Other non-seismic types of data can also be inverted, such as gravity, gravity gradient, electrical, electro-magnetic measurements, geological data (chrono-stratigraphy, geological features, etc.).

To summarize, according to an embodiment, the seismic data observed in seismic migrated domains is model dependent and is first de-migrated, to obtain the so-called invariants, i.e., model-independent pseudo-observations. The non-linear slope tomography illustrated in FIG. 7A then inverts, under constraints, this data for updating, for example, an acoustic, elastic or visco-elastic velocity model that will be typically used for computing wave-propagation of measured seismic waves and imaging the subsurface (this includes depth migration algorithms, full waveform inversion, elastic inversion, etc.). The inversion engine minimizes a cost function that measures the mis-focusing and the mis-positioning of all of the locally coherent events to invert, according to a given norm (usually between 1 and 2, for example, least-squares). Because raw observations are inverted, the tomography may include, as discussed above with reference to FIG. 7A, an iteration of forward-modeling and inverse-modeling steps that stops when the cost function reaches an acceptable minimum. The forward modeling step involves the computation of travel-time and of focusing information (for example the RMO of kinematically migrated events) in the current velocity model. The inverse-modeling step estimates, using possibly a relaxation method, both the layer velocity parameter perturbations and non-pickable horizon depth shifts obtained, for example, by solving a linear system of tomographic equations, and the shape of the remaining layer boundaries.

The velocity parameter perturbations can be any visco-elastic parameter, including Vp, Vs, epsilon, delta, TI main axis of symmetry, orthorhombic parameters and attenuation factor Q. The constraints may include bringing a-priori information and/or physical or geometrical regularization rules for better solving the inherently ill-posed tomographic problem. The tomography engine is adapted to estimate both velocity and horizon depth shifts (see step 710). In a more conventional manner, the other layers boundaries than can be picked from initially migrated data can be re-positioned through map-migration (see step 712) preserving their travel-time characteristics (in particular zero-offset two-way-time) so that repositioned boundaries are correctly superimposed upon their pre-stack depth migrated image obtained by migrating seismic signals with the updated velocity model: the zero-offset time consistent repositioning of the horizon is commonly called a "map-migration". The non-linear approach of the process of FIG. 7A makes it possible to start the tomography from any model because the data to be inverted is model independent.

The internal forward-modeling capability avoids or limits the necessity of iterating heavy seismic processing sequences including pre-stack depth migration, and residual move-out picking.

According to one or more embodiments, the quality of the final seismic imaging product (e.g., image of the surveyed subsurface) improves as discussed next. In one embodiment, both the seismic image resolution and the interpretability is improved. In another embodiment, a turnaround time for imaging is reduced as less effort is put on the interpretation of key horizons.

Figure 9B:
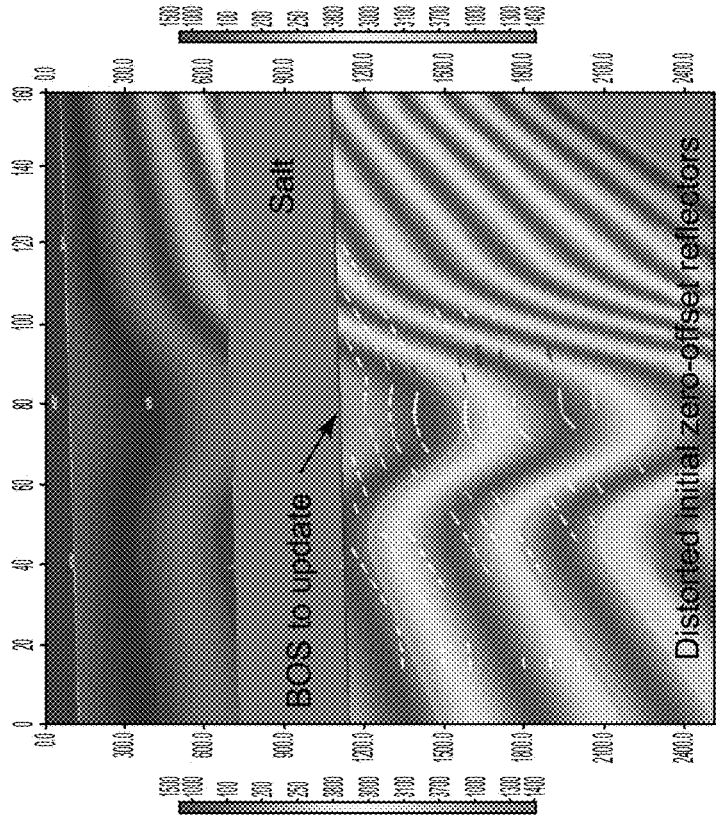
Figure 9A:
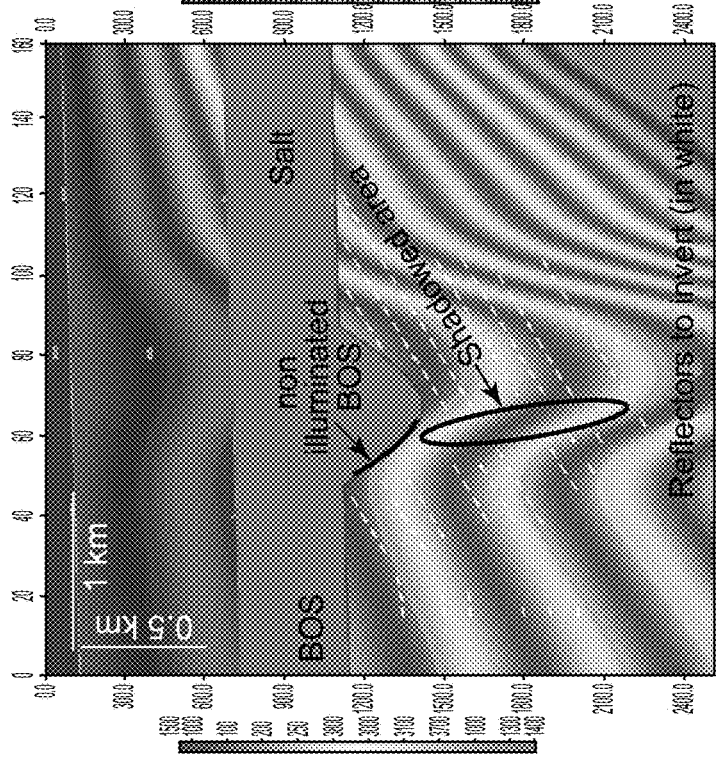

The above discussed process has been applied to a synthetic example that is illustrated in FIG. 9A. FIG. 9A shows the BOS having a non-illuminated area in the salt, which is not well reproduced by an initial model illustrated in FIG. 9B. After a first iteration, the modeled salt layer in FIG. 9C has a better BOS. After the process runs a couple of iterations until the condition in step 718 is met, a final model is obtained as illustrated in FIG. 9D, which shows that the calculated reflectors and BOS are very similar to the actual reflectors and BOS.

Figure 10:
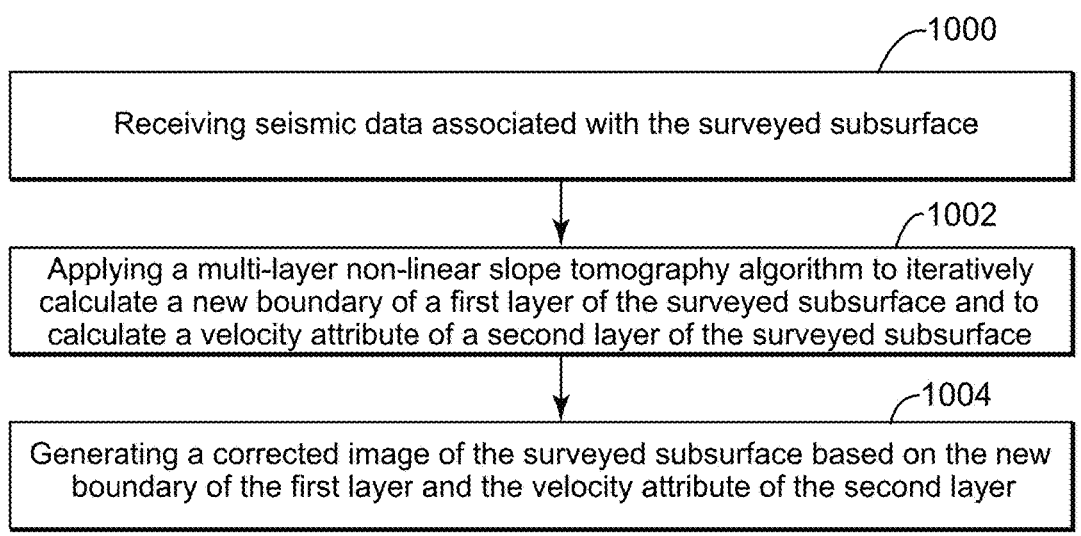
FIG. 10 is a flowchart illustrating a method for processing seismic data according to an embodiment.

According to an embodiment illustrated in FIG. 10, there is a method for correcting an image of a surveyed subsurface. The method includes a step 1000 of receiving seismic data associated with the surveyed subsurface, a step 1002 of applying a multi-layer non-linear slope tomography algorithm to iteratively calculate a new boundary of a first layer of the surveyed subsurface and to calculate a velocity attribute of a second layer of the surveyed subsurface, and a step 1004 of generating a corrected image of the surveyed subsurface based on the new boundary of the first layer and the velocity attribute of the second layer.

Figure 11:
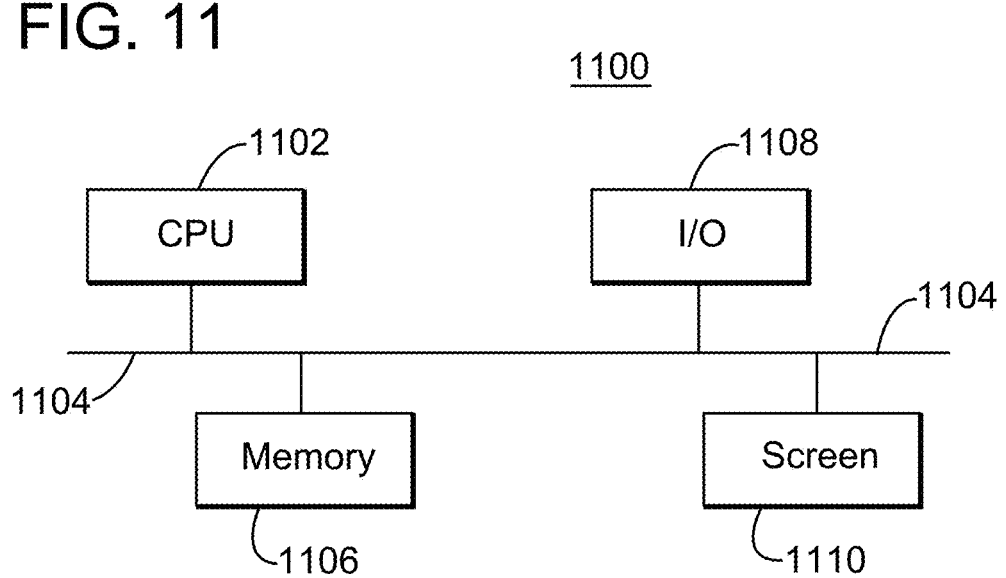
FIG. 11 illustrates a computing device that implements one or more processes discussed herein.

An exemplary computing device for running the methods and/or processed discussed above is illustrated in FIG. 11. The computing device 1100 includes a processor 1102 that is connected through a bus 1104 to a storage device 1106. Computing device 1100 may also include an input/output interface 1108 through which data can be exchanged with the processor and/or storage device. For example, a keyboard, mouse or other device may be connected to the input/output interface 1108 to send commands to the processor and/or to collect data stored in storage device or to provide data necessary to the processor. In one application, the processor calculates the volumetric and boundary invariants based on the seismic data, which may be provided through the input/output interface. Also, the processor may be used to process, for example, the multi-layer non-linear slope tomography process. Results of this or another algorithm may be visualized on a screen 1110.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for improving an image of a surveyed subsurface, the method comprising:
    receiving seismic data acquired over the surveyed subsurface;
    applying a multi-layer non-linear slope tomography algorithm to the seismic data in which an image of the surveyed subsurface is iteratively improved by updating in each iteration a depth of a boundary of a first layer of the surveyed subsurface, a velocity attribute of a second layer of the surveyed subsurface and a horizon of a third layer of the surveyed subsurface, the second and the third layer being different from the first layer; and
    generating an improved image of the surveyed subsurface based on the boundary of the first layer and the velocity attribute of the second layer,
    wherein the improved image is used to assess presence of oil and/or gas reservoirs.

2. The method of claim 1, wherein a velocity attribute for the first layer is known.

3. The method of claim 1, wherein the step of applying the tomography algorithm iteratively updates boundaries for plural first layers and velocity attributes for plural second layers in each iteration, with no layer pertaining to both the plural first and the plural second layers.

4. The method of claim 1, wherein the step of applying further comprises:
  calculating boundary invariants associated with the seismic data; and
  calculating volumetric invariants associated with the seismic data,
  wherein the volumetric and the boundary invariants are model independent.

5. The method of claim 4, wherein the volumetric invariants are used to update the velocity attribute and the boundary invariants are used to update the boundary.

6. The method of claim 1, wherein the boundary is obtained by shifting a previous boundary of the first layer with a given quantity.

7. The method of claim 6, wherein the given quantity is calculated with a Frechet derivative.

8. The method of claim 1, wherein the boundary describes a layer that is not visible in an initial image of the subsurface.

9. The method of claim 1, further comprising:
  repositioning the second layer after the velocity attribute has been calculated, but not repositioning the first layer.

10. A computing device for improving an image of a surveyed subsurface, the computing device comprising:
  an interface that receives seismic data acquired over the surveyed subsurface; and
  a processor connected to the interface and configured to,
  apply a multi-layer non-linear slope tomography algorithm to the seismic data, in which an image of the surveyed subsurface is iteratively improved by updating a depth of a boundary of a first layer of the surveyed subsurface, a velocity attribute of a second layer of the surveyed subsurface and a horizon of a third layer of the surveyed subsurface, the second and the third layer being different from the first layer; and
  generate an improved image of the surveyed subsurface, wherein the improved image is used to assess presence of oil and/or gas reservoirs.

11. The computing device of claim 10, wherein a velocity attribute for the first layer is known.

12. The computing device of claim 10, wherein the processor is further configured to iteratively update boundaries for plural first layers and velocity attributes for plural second layers, wherein, in each iteration, no layer pertains to both the plural first and the plural second layers.

13. The computing device of claim 10, wherein the processor is further configured to:
  calculate boundary invariants associated with the seismic data; and
  calculate volumetric invariants associated with the seismic data,
  wherein the volumetric and the boundary invariants are model independent.

14. The computing device of claim 13, wherein the volumetric invariants are used to update the velocity attribute and the boundary invariants are used to update the boundary.

15. The computing device of claim 10, wherein the boundary is obtained by shifting a previous boundary of the first layer with a given quantity.

16. The computing device of claim 15, wherein the given quantity is calculated with a Frechet derivative.

17. The computing device of claim 10, wherein the boundary describes a layer that is not visible in an initial image of the subsurface.

18. A non-transitory computer readable medium storing executable codes which, when executed on a computer, makes the computer perform a method for improving an image of a surveyed subsurface, the instructions comprising:
  receiving seismic data acquired over a surveyed subsurface;
  applying a multi-layer non-linear slope tomography algorithm to the seismic data in which an image of the surveyed subsurface is iteratively improved by updating a depth of a boundary of a first layer of the surveyed subsurface, a velocity attribute of a second layer of the surveyed subsurface and a horizon of a third layer of the surveyed subsurface, the second and the third layer being different from the first layer; and
  generating an improved image of the surveyed subsurface,
  wherein the improved image is used to assess presence of oil and/or gas reservoirs.

* * * * *